United States Patent [19]

Palmer

[11] Patent Number: 4,681,556
[45] Date of Patent: Jul. 21, 1987

[54] ASSEMBLY OF COMPOSITE SHAFT AND YOKE MEMBER OF A HOOKES UNIVERSAL JOINT

[75] Inventor: Bertram J. Palmer, Barton Under Needwood, Great Britain

[73] Assignee: BRD Company Limited, Walsall, England

[21] Appl. No.: 668,727

[22] PCT Filed: Mar. 8, 1984

[86] PCT No.: PCT/GB84/00073
§ 371 Date: Oct. 29, 1984
§ 102(e) Date: Oct. 29, 1984

[87] PCT Pub. No.: WO84/03544
PCT Pub. Date: Sep. 13, 1984

[30] Foreign Application Priority Data
Mar. 9, 1983 [GB] United Kingdom ............... 8306543

[51] Int. Cl.⁴ ........................... F16C 7/00; F16C 1/02
[52] U.S. Cl. ........................... 464/181; 464/134; 464/183
[58] Field of Search ............... 464/134, 179, 181, 182, 464/183; 403/57, 58; 138/109; 285/156, 423

[56] References Cited

U.S. PATENT DOCUMENTS

| | | | |
|---|---|---|---|
| 2,067,283 | 1/1937 | Padgett | 464/134 |
| 3,651,661 | 3/1972 | Darrow | 464/181 |
| 4,106,797 | 8/1978 | Michael | 285/156 |
| 4,248,062 | 2/1981 | McLain et al. | 464/181 |
| 4,275,122 | 6/1981 | Fisher | 403/57 X |
| 4,325,174 | 4/1982 | Smith et al. | 464/181 X |
| 4,345,625 | 8/1982 | Mayumi et al. | 138/109 X |

FOREIGN PATENT DOCUMENTS

| | | | |
|---|---|---|---|
| 2851292 | 5/1979 | Fed. Rep. of Germany | |
| 44536 | 3/1982 | Japan | |
| 2040395 | 8/1980 | United Kingdom | 464/134 |
| 261892 | 1/1970 | U.S.S.R. | 403/57 |

Primary Examiner—Daniel P. Stodola
Attorney, Agent, or Firm—Marshall, O'Toole, Gerstein, Murray & Bicknell

[57] ABSTRACT

An assembly of a drive shaft of composite, fibre reinforced resin, material and a yoke member of a Hookes universal joint, the latter comprising a sheet metal element with a spigot portion (10) and two transverse tubular portions (11) which form or receive bearing elements for the universal joint. The fibres of the shaft are wound helically on the spigot portion and circumferentially around the tubular portions of the metal element, and reinforce the latter so that it need only be of thin sheet material.

6 Claims, 2 Drawing Figures

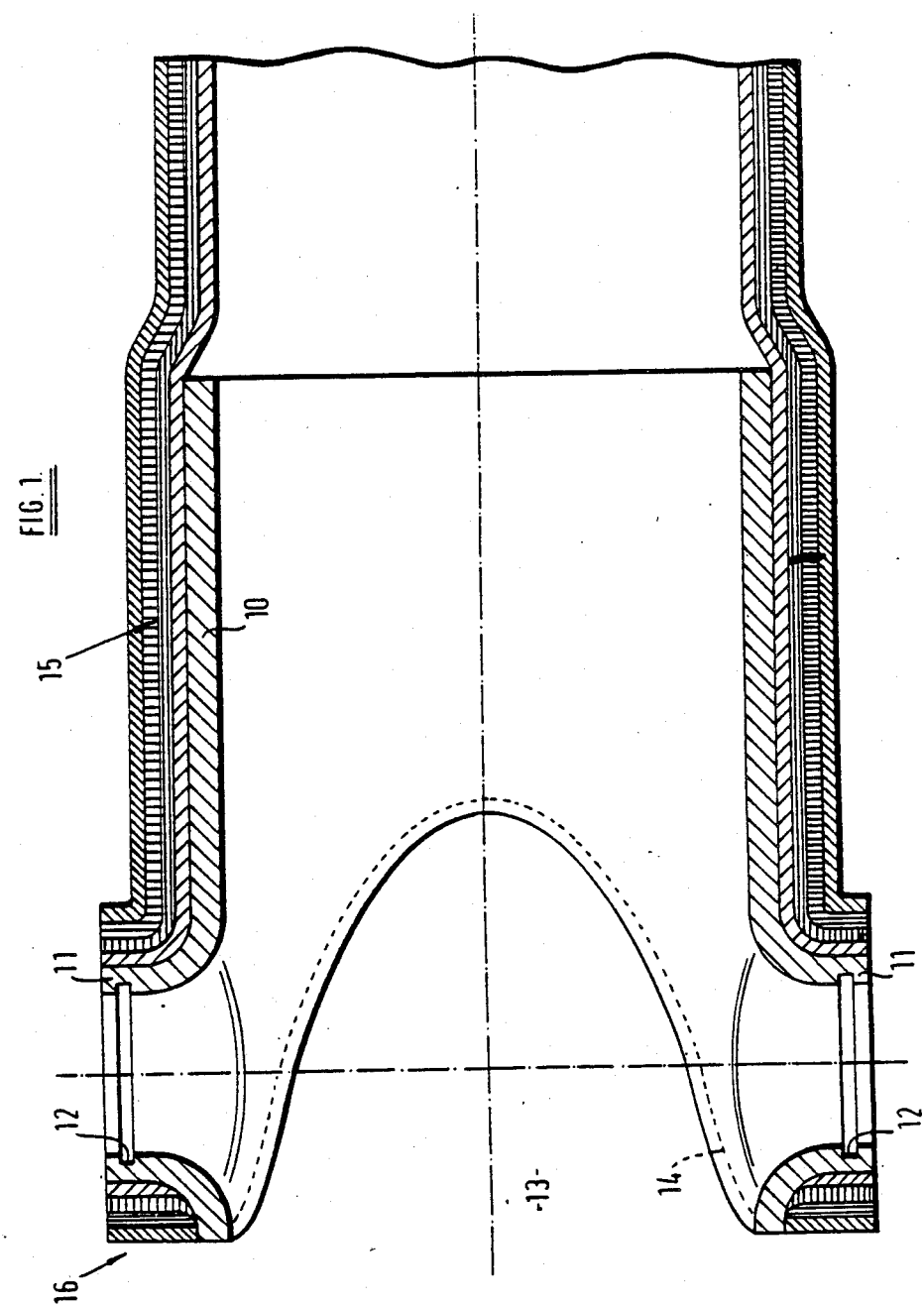

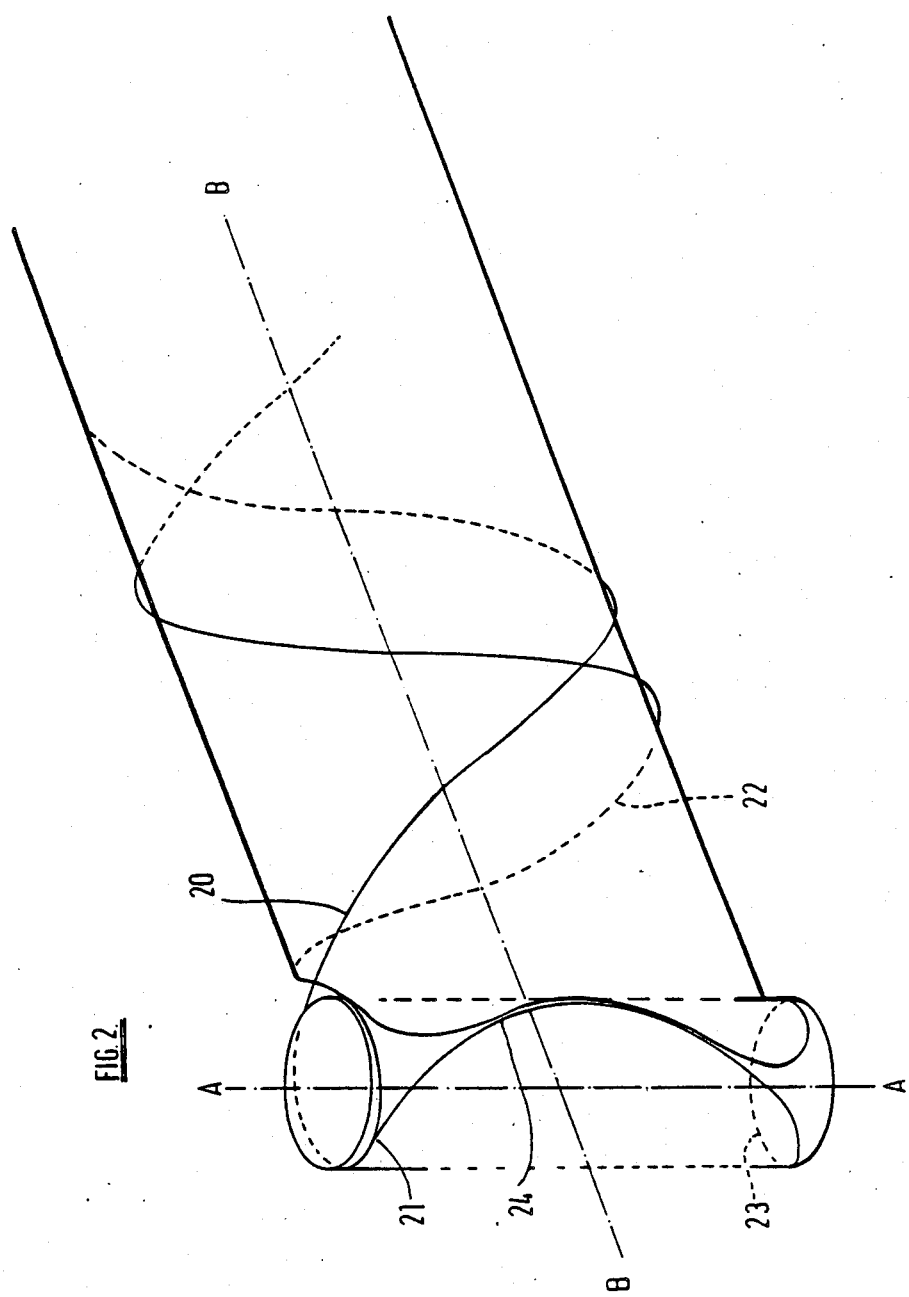

ASSEMBLY OF COMPOSITE SHAFT AND YOKE MEMBER OF A HOOKES UNIVERSAL JOINT

This invention relates to shafts made of composite, fibre reinforced resin, material. More particularly the invention relates to an assembly of such a shaft and a yoke member of a Hookes universal joint. Such shafts may be used, for example, as drive shafts extending between engine and rear axle in conventional rear wheel drive motor vehicles.

It has been proposed hitherto that the yoke member of a Hookes universal joint can be secured to a composite shaft by use of an adhesive. The yoke member may be incorporated in the structure of the shaft during manufacture thereof by winding the fibres over a mandrel which is subsequently removed, the yoke member being positioned on the mandrel and the fibres being wound thereover. Such constructional methods, however, require the use of yoke members which are of massive construction with a tubular spigot portion over which the fibres are wound, the yokes typically being steel forgings. Such construction is heavy and expensive.

It is the object of the present invention to reduce these disadvantages.

According to the invention, we provide an assembly of a composite, fibre reinforced resin, shaft and a yoke member of a Hookes universal joint, the yoke member comprising a sheet metal element with a spigot portion extending axially of the shaft and tubular portions extending transversely thereof and adapted to form or receive bearing elements of the joint, the shaft including fibres wound around said spigot portion and fibres extending around at least part of the circumference of said tubular portions.

Winding the fibres on the yoke member in such a way that they reinforce the tubular portions thereof enables the yoke member to be entirely of relatively thin sheet metal such as steel or an aluminium alloy. The extending of the fibres around the tubular portions also provides a high degree of axial security and torque transmitting ability between the yoke member and shaft, compared with that which would obtain if the fibres were wound around the spigot portion only of the yoke member.

The tubular portions may be integral with the rest of the yoke member. Alternatively they may be separate sheet metal components.

The yoke member may be manufactured from flat sheet metal which is formed to a generally tubular configuration, or may be manufactured from tube stock.

These and other features of the invention will now be described by way of example with reference to the accompanying drawings, of which:

FIG. 1 is a section through an assembly according to the invention.

FIG. 2 shows diagrammatically one method of fibre winding according to the invention.

The assembly illustrated in FIG. 1 comprises a sheet metal Hookes joint yoke member with a spigot portion 10 extending axially of the shaft and two tubular portions 11 extending transversely thereof. The portions 11 are provided internally with grooves 12 for receiving circlips by which bearing cups are retained in the portions 11, for supporting opposed trunnions of the cross member of a Hookes joint. At its free end, the yoke member has diametrically opposed cutaways 13 which accommodate the other trunnions of the cross member and other yoke of the joint when assembled, and the boundary of this cut-away is flanged at 14, to provide a guide for fibre winding and to assist rigidity.

The spigot portion 10 of the yoke member has layers 15 of resin impregnated fibres wound thereon. Typically such fibres will include successive layers wound at different helix angles. Fibres are also wound at 16 on the tubular portions 11 of the yoke member to extend at least partly around the circumference thereof. The windings of such fibres may be continuous with those fibres 15 wound helically on the spigot portion 10 and forming the shaft itself.

One possible configuration of winding such fibres is shown in FIG. 2. In that Figure, the axis of the shaft and spigot portion 10 of the joint yoke member is shown at B—B and that of the tubular portions 11 at A—A. One fibre winding is shown extending helically around the spigot portion at 20, circumferentially at 21 around one of the tubular portions of the yoke member, and then returning at 22 along the spigot portion helically in the opposite sense and direction. Other windings would extend around the opposite tubular portion of the yoke member, and thus the shaft would be progressively built up. Some fibres may extend circumferentially of one of the tubular portions of the yoke member, as shown at 23 in FIG. 2, and then as shown at 24 to the other tubular portion of the yoke member, to form a "figure of eight" pattern around the yoke member and between its two tubular portions 11, in a developed view thereof. Such fibres extend along the edge of the cutaway 13 of the yoke member.

In manufacture of an assembly according to the invention, the yoke member may be formed by appropriate pressing operations from flat sheet metal or tubular stock. The tubular portions 11 may be integral with the remainder of the yoke member, or may be separate tubular components secured thereto by welding or mechanical fixing. The yoke member would be placed on a mandrel and fibres, impregnated with a suitable resin, wound thereon to form the shaft and secure the yoke member therein. Subsequent to curing of the resin, the mandrel would be removed. Machines for winding fibres in predetermined configurations on mandrels are well known, and need not be described in detail herein.

The above description relates to a yoke member which, as is usual for automotive drive shaft application, receives bearing cups which in turn receive opposed journals of the cross member of the Hookes joint. However, the invention is applicable to Hookes joints for other applications in which different bearing constructions are utilized. For example, journals of the cross member may be received directly in the tubular portions of the yoke member, provided the cross member is appropriately dimensioned to enable it to be assembled in the yoke. Such a construction may be suitable for light duty, e.g. a steering shaft.

I claim:

1. An assembly of a shaft of composite, fibre reinforced resin material and a yoke member of a Hookes universal joint, the yoke member comprising a sheet metal element having a spigot portion extending axially of the shaft and two diametrically opposed tubular portions extending transversely thereof and adapted to form or receive bearing elements of the joint, the shaft including fibres would around said spigot portion and fibres wound around said tubular portions, at least some of said fibres extending continuously around said spigot portion and at least one of said tubular portions.

2. An assembly according to claim 1 further comprising diametrically opposed cutaways extending axially from the free end of the yoke member, between said tubular portions thereof.

3. An assembly according to claim 2 wherein said yoke member has a flange at its free end, at least in the region of said cutaways.

4. An assembly according to claim 1 including fibres extending helically along said spigot portion, circumferentially relative to and around a tubular portion of the yoke member, and helically in the opposite direction along said spigot portion.

5. An assembly according to claim 4 and further comprising fibres extending around said tubular portions circumferentially thereof, and in a "figure of eight" configuration, in developed view, therebetween.

6. An assembly according to claim 1 including fibres extending circumferentially relatively to and around said tubular portions and in a "figure of eight" configuration, in developed view, therebetween.

* * * * *